US006054167A

United States Patent [19]

Kincs et al.

[11] Patent Number: 6,054,167

[45] Date of Patent: Apr. 25, 2000

[54] PELLETIZED SHORTENING

[75] Inventors: Frank R. Kincs, Chicago; Reynaldo G. Cruz; Thomas G. Crosby, both of Bourbonnais, all of Ill.

[73] Assignee: Bunge Foods Corporation, Bradley, Ill.

[ * ] Notice: This patent is subject to a terminal disclaimer.

[21] Appl. No.: 09/234,279

[22] Filed: Jan. 19, 1999

Related U.S. Application Data

[63] Continuation-in-part of application No. 08/704,117, Aug. 28, 1996, Pat. No. 5,866,187.

[51] Int. Cl.[7] .................... A21D 10/00

[52] U.S. Cl. .................... 426/549; 426/553; 426/606

[58] Field of Search .................... 426/549, 553, 426/606, 516, 517

[56] References Cited

U.S. PATENT DOCUMENTS

| | | | |
|---|---|---|---|
| 3,006,770 | 10/1961 | Wiedermann | 426/555 |
| 4,343,826 | 8/1982 | McNaught . | |
| 4,391,838 | 7/1983 | Pate . | |
| 4,469,710 | 9/1984 | Rielley | 426/607 |
| 4,889,740 | 12/1989 | Price . | |
| 4,891,233 | 1/1990 | Belanger . | |
| 4,961,951 | 10/1990 | Crosby . | |
| 5,064,670 | 11/1991 | Hershorn . | |
| 5,211,981 | 5/1993 | Purves . | |
| 5,254,356 | 10/1993 | Busken . | |
| 5,268,191 | 12/1993 | Crosby . | |
| 5,395,638 | 3/1995 | Kincs et al. . | |
| 5,436,021 | 7/1995 | Bodor . | |
| 5,866,187 | 2/1999 | Kincs | 426/549 |

OTHER PUBLICATIONS

Loeve 1937 Experimental Cooking, John Wiley & Sons, Inc, London, 2nd ed. p. 531, 536–539.

*Primary Examiner*—Carolyn Paden
*Attorney, Agent, or Firm*—Cook, Alex, McFarron, Manzo, Cummings & Mehler

[57] ABSTRACT

A pelletized shortening is prepared by a process which includes melting, cooling, solidifying and extruding natural and/or synthetic shortening materials to provide shortening pellets or chunks which, without requiring further processing, resist clumping together at at least moderate temperatures of about 70° F. (about 21° C.). The pelletized shortening has a hardness or solids profile which is especially suitable for baking applications and imparts a tenderizing effect in bakery type products while still providing a shortening in a form that is easy to handle inasmuch as it is pourable or able to be metered in a flowing particulate style. While it has relatively high solids at room temperature or storage conditions, the solids content of the pelletized shortening dissipates rapidly enough such that the solids reduction will provide the desired tenderizing effect in dough products including biscuits and pizza crusts.

13 Claims, 1 Drawing Sheet

11
12
13
14
15
16
17
18
19
20
21
22
23
24
25
26
27
28
28a
29
30
31
32
33
34

PELLETIZED SHORTENING

CROSS REFERENCE TO RELATED APPLICATION

This is a continuation-in-part of application Ser. No. 08/704,117, filed Aug. 28, 1996 now U.S. Pat. No. 5,866, 187.

BACKGROUND AND DESCRIPTION OF THE INVENTION

This invention generally relates to shortening in the form of solids such as pellets or chunks. The shortening is primarily vegetable oil or low-fat or fat substitute, or combination thereof, in a solid form suitable for uses requiring a non-liquid which is still able to be poured or metered. More particularly, the invention relates to pelletized shortening and the like which resists clumping under room temperature conditions which are encountered in many uses. The pellets are formed by extruding a flow of solidified shortening through extrusion orifices which impart a desired pellet size and shape upon passing therethrough.

Pourable shortening products are generally known. In one approach, shortening has been frozen and passed through a meat grinder in an effort to obtain solid shortening pellets. This approach is somewhat difficult and not particularly satisfactory such as from the point of view of consistency of product. Another approach is exemplified by U.S. Pat. No. 4,469,710. Hydrogenated fats are heated, rapidly chilled, treated and formed into small segments or pieces which are said to be particularly resistant to agglomeration at elevated temperatures. Such products can require involved processing conditions and equipment and can produce products having higher solid fat indices than required or desired for certain applications, particularly baking applications.

In accordance with the present invention, pelletized shortening is provided and prepared by cooling molten shortening materials, for example partially hydrogenated vegetable oil or a lipid-like fat substitute, solidifying same to a desired extent, flowing the cooled and solidifying shortening material through an elongated tube to form a flow of solid shortening within the elongated tube, and passing the flow of solid shortening through a plurality of orifices at a downstream end portion of the elongated tube to thereby extrude the solid shortening flow through the orifices as a plurality of shortening pellet flows which are each of a cross-sectional area which is reduced from that of the flow through the elongated tube, thus forming the shortening pellets. The solid shortening pellets, without requiring any further treatment, resist clumping together at a temperature of at least about 70° F.

It is accordingly a general object of the present invention to provide an improved process, apparatus, and pelletized shortening prepared thereby.

Another object of the present invention is to provide an improved shortening in the form of chunks or pellets which can be poured or metered and used for creating special effects in baking operations, such as a tenderizing effect in dough products.

Another object of this invention is to provide an improved pelletized shortening which resists clumping together at a temperature of at least about 70° F. while having a solid fat index profile that is tailored for particular end uses.

Another object of the present invention is to provide an improved, simplified process and apparatus for extruding shortening material directly into pellets.

These and other objects, features and advantages of the present invention will be apparent from and clearly understood through a consideration of the following detailed description.

BRIEF DESCRIPTION OF THE DRAWINGS

In the course of this description, reference will made to the attached drawings, wherein.

DETAILED DESCRIPTION OF THE INVENTION

Figures 1, 2, 3:
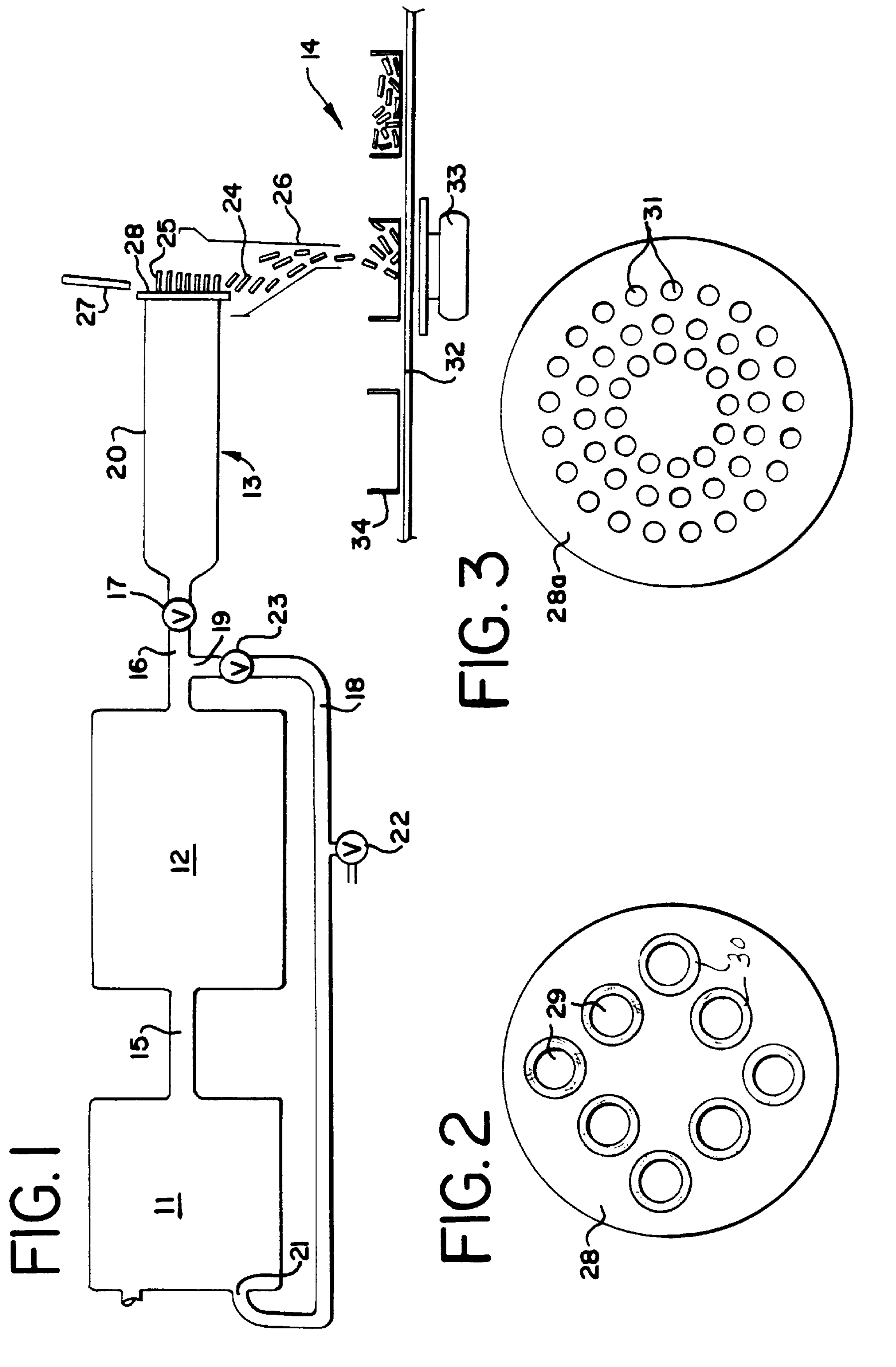
FIG. 1 is a generally schematic elevational view of a preferred embodiment of an apparatus for carrying out the process.
FIG. 2 is a detailed view of an extrusion plate for making relatively large sized shortening pellets.
FIG. 3 is a detailed view of an extrusion plate for making relatively small sized shortening pellets.

The preferred apparatus illustrated in FIG. 1 includes a feed tank 11 for developing a flow of molten shortening, a chilling and crystallizing device 12, a resting tube unit 13, and a scaling and packaging assembly 14. These shortening materials when referred to herein encompass vegetable oils, low-fat substitutes and fat substitutes. Included are lipid-like fat substitutes and polyol substitutes such as sucrose polyester (available as OLESTRA® and OLEAN®) and esterified propoxylated glycerols. Combinations are possible, such as partly polyol substitute and partly triglyceride material.

In an illustrated embodiment, the shortening material is a vegetable oil, typically partially hydrogenated vegetable oil. Initially, this vegetable oil is raised to a temperature such that it is liquified or emulsified. Feed tank 11 receives a batch of this shortening material, or a flow of same is provided by such a tank or by an assembly with heating capabilities. When within the feed tank 11 or an analogous vessel or assembly, the molten shortening is at a temperature of about 110–150° F., which temperature can vary somewhat depending the particular make-up of the vegetable oil or other shortening material. In any event, at this stage of this example, there is provided a supply, whether in the form of a flow or a batch, of molten vegetable oil, the oil being at a temperature above its melting point.

This molten shortening material flows through a conduit 15 or the like and into the chilling and crystallizing device 12. Within this device, the temperature of the shortening material is reduced so that the it is chilled in order to develop seeds of crystalline shortening which will eventually develop so as to solidify the shortening during the process. Preferably, this chilling will be in combination with agitation in order to promote uniform crystal development while the shortening material is within the chilling and crystallizing device 12. This flow of, for example, vegetable oil containing crystals exits through conduit 16. At this point, the vegetable oil or other shortening material should exhibit the proper degree of solidification or crystallization. A typical target in this regard would be between about 25% and about 35% solids within the flow of solidifying shortening material out of the exit conduit 16. If this target has been achieved, the shortening material is allowed to flow into the resting tube unit 13 or the like, such as by passing through a valve 17 which is thus in an open condition. Solidification will then be completed, as discussed in further detail herein.

If the solidifying vegetable oil or other shortening material is not at the target solids level, it preferably will be directed back into the feed tank device 11. An illustrated system for achieving this objective is a recycle assembly 18. In this arrangement, when the valve 17 is closed or partially closed, all or a portion of the flow of shortening material is allowed to divert through diverter passage 19 for eventual return to the feed tank 11 through recycle entrance 21 so as to again melt the shortening material prior to its eventual return flow through the chilling and crystallizing device 12. Monitoring of the solids percentage can be achieved by a suitable approach such as sampling bleed line 22. If the target solids level is being achieved and maintained, recycling will not occur, such as by closing valve 23 of the recycle assembly.

The chilling and crystallizing device 12 will be at a temperature of between about 55 and 95° F. (about 12.8 and 35° C.), depending upon the vegetable oil or other shortening material being processed, the particular type of chilling and crystallizing device, and the type of equipment downstream of it, especially the length and volume of the elongated tube 20 of the resting unit. Exemplary chilling and crystallizing devices include Votator devices, Gerstenberg chillers, Kombinator units (trademarks), and the like.

The thus cooled and crystallizing partially solidified vegetable oil or other shortening material which is within the target solids content next flows into and through the resting tube unit 13. This unit provides additional time and physical space to allow crystallization and solidification to continue. An objective is to have all or most of the heat of crystallization removed from the solidifying shortening flow by the time the shortening material reaches the downstream end of the resting tube unit 13. This effect can be facilitated by appropriate heat transfer assemblies or devices and can also be affected by the diameter or cross-sectional area of the elongated tube 20. For example, the unit 13 can be jacketed whereby the heat of crystallization can be reduced by heat transfer with a flowing, cooling liquid. By the time the shortening material reaches the downstream end portion of the elongated tube 20 of the resting unit 13, it takes the form of a flow of solidified shortening. Typical flow times in this regard are at least approximately 1 minute, often at about 2 minutes and above such as about 10 minutes.

This solid shortening flow passes through a plurality of orifices at this downstream end portion of the elongated tube. Each orifice will have a diameter or cross-sectional area which is substantially less than that of elongated tube. By this approach, the solid shortening is forced to, within and through the plurality of orifices so as to be extruded into elongated strands or extruded rods 25. The result is the direct formation of shortening pellets 24. By the time of this extrusion stage, the shortening processing has been completed to the extent that the pellets 24 are in a condition to be packaged without further treatment.

In most instances, the pellets 24 are automatically provided to the desired length due to the influence of gravity upon the narrowed, elongated strands of solid shortening exiting from the resting tube unit 13. In other words, once the extruded shortening passes out of the unit 13, it is no longer supported. Once the extrusion achieves a reasonably predictable length, it will move downwardly until it breaks off from the extruded flow. This is generally illustrated in FIG. 1 after the shortening pellets 24 break off and are formed from the extrusion rods 25. The resulting shortening pellets 24 can be collected, such as with the assistance of a hopper 26, and moved onto the scaling and packaging line 14. If desired, an optional cutter 27 can be included when it desired to ensure that shortening pellets of a uniform length are prepared.

In the preferred resting tube unit 13 which is illustrated, the downstream end takes the form of a sieve plate or extrusion plate 28. Illustrative plates in this regard are shown in somewhat greater detail in FIG. 2 and in FIG. 3. Extrusion plate 28 in FIG. 2 has a plurality of orifices 29. In this embodiment, each would have an internal diameter of about 0.5 inch (about 13 cm). This embodiment also illustrates that the orifices can include a sloped surface 30 on the pressure (upstream) side of the plate 28. The sloped surfaces 30 are in the nature of a chamfer or arcuate beveled edge, although the shape of the holes does not necessarily have to be circular. This sloping reduces the sharp edge upon which the shortening would otherwise impinge. A result is a lowering of the pressure drop causing less work-softening (and less stickiness) on the surface of the extruded solids. Sieve plate 28*a* illustrated in FIG. 3 includes a plurality of orifices 31, each having a diameter of about 0.25 inch (about 6.3 cm). By contrast, a typical inner diameter of the longitudinal tube of the resting tube unit 13 is between about 4 inches (100 cm) and about 8 inches (200 cm).

A reduction ratio (on the basis of diameters) of the elongated tube to the extrusion orifices ranges between about 50 to 1 and about 5 to 1, preferably between about 32 to 1 and about 8 to 1. With this approach, the properly solidified shortening will be further solidified by compaction pressures generated as the shortening component is forced through the relatively much smaller openings in finally forming the shortening pellets 24.

With reference to the scaling and packaging line 14 which is generally illustrated, it can include a conveyor 32 having a scale component 33 of a type generally well known in the art. Individual packaging components such as paperboard boxes 34 are conveyed to a location under the hopper 26. Each package 34 is filled until the proper weight is attained, after which the thus filled package is conveyed away, and subjected to typical closing and sealing procedures and equipment in accordance with generally known practices.

With reference to the shortening pellets which are prepared in accordance with the present invention, they can be considered as chunks or pellets which are able to be poured or metered such as during industrial or institutional baking or cooking procedures. When the shortening is vegetable originating, the vegetable oil typically will be primarily oil component such as soybean oil, cottonseed oil, peanut oil, corn oil, combinations thereof and the like. Typically, the oil will be partially hydrogenated prior to heating. Depending upon the desired ultimate use for the shortening pellets, they can include minor components such as coloring agents or flavoring agents; for example, beta carotene can be added to impart a yellow color when it is desired that the shortening pellets have a butter-like appearance and/or taste.

After processing, the shortening material in its shortening pellet or solidified form will have a melting point (Mettler Dropping Point) of between about 110° and about 120° F. (about 43.3 and about 48.9° C.), this melting point depending somewhat upon the desired ultimate end use for the shortening pellets. The shortening pellets have a typical matrix of solids content ranges (solids fat contents or SFC as measured by NMR) as follows:

| Temperature | Percent Solids (SFC) |
|---|---|
| 50° F. (10° C.) | 53% to 85% |
| 70° F. (21.1° C.) | 35% to 65% |

-continued

| Temperature | Percent Solids (SFC) |
|---|---|
| 80° F. (26.7° C.) | 27% to 60% |
| 92° F. (33.3° C.) | 20% to 50% |
| 100° F. (37.7° C.) | 13% to 35% |
| 104° F. (40° C.) | 7% to 20% |
| 110° F. (43.3° C.) | 3% to 14% |

Shortening pellets provided in accordance with the present invention are particularly useful as baking shortenings. When blended with and/or folded in, they impart special flakiness and a layered texture and consistency because of their relative size and solid characteristics. The pellets can have a length of about 2 inches to about 3 inches (about 50 cm to about 75 cm), although even greater lengths can be possible as desired, perhaps even as long as about 6 inches to about 8 inches (about 150 cm to about 200 cm). The pellets will typically be used in their solid, perhaps even refrigerated, state. For example, the pelletized shortening is found to be particularly useful in certain baking procedures which demand separate integrity between the fat and the dough ingredients until the baking process has progressed enough to ensure a flaky result. A similar observation can be made with respect to baking biscuits and the like. It is important in these types of uses that the shortening pellets are not too hard or solid, such that they might not melt well enough in the particular baking use. This potentially is a concern in the lighter baking formulations. In addition to these advantages in baking, the shortening pellets can be used in other cooking applications where convenience and easy handling is of interest. Non-baking uses include deep frying of donuts and the like, wherein the user can simply "pour" the shortening pellets into the deep fryer.

When used in baking, the shortening pellets will comprise approximately 5% to approximately 25% by weight of a particular dough formulation. In general, dough formulations consist of flour components, and one or more of sweetening components such as sugar, syrups and artificial sweeteners, egg components, milk components and water. Exemplary doughs can be formulated for biscuits, cakes, cookies, pie crusts, pizza crusts, rolls and the like. The pellets thus used impart a tenderizing quality in these bakery types of products.

The following Examples generally illustrate certain aspects of the invention.

EXAMPLE 1

An apparatus as generally illustrated in FIG. 1 included a Schroder Kombinator as the chilling and crystallizing device. A manual diversion valve was installed between this unit and the resting tube. A remelt return line was set up. Partially hydrogenated soybean oil was combined with approximately 1% of coloring and other minor ingredients. A batch of about 5000 pounds of the vegetable oil blend at about 145° F. (62.8° C.) was pumped from the storage tank for providing the emulsion to the Kombinator unit. Recycle to a remelt tank and return to the Kombinator unit was carried out until the vegetable oil was about 30% solids. The Kombinator unit was at 80° F. (about 26.7° C.), and the flow rate was controlled by a high pressure pump. The resting tube had a sieve plate with 206 holes, each having a diameter of about 0.5 inch (about 13 cm). The resting tube had a length of about 9 feet (about 2.7 m). At a flow rate of 4500 to 5000 pounds per hour, the solidifying vegetable oil which flowed out of the cooling and agitating zone of the Kombinator unit remained in the resting tube for an average of about 2 minutes and 15 seconds.

The resulting shortening chunks had a diameter of 0.5 inch (13 cm) and a length of about 2 to 3 inches (about 50 to 75 cm), although some shorter chunks were also formed. With the minor additions to the formulation, the color and flavor was characterized as buttery. Its Mettler Dropping Point (melt point) was 112° F. (44.4° C.), and its Iodine Value was 65. Solid fat index analyses indicated 58 units at 50° F. (10° C.), 48 units at 70° F. (21.1° C.), 45 units at 80° F. (26.7° C.), 31 units at 92° F. (33.3° C.) and 12 units at 104° F. (40° C.).

EXAMPLE 2

A vegetable oil composition is prepared with hydrogenated soybean oil having added flavor and color components, including beta carotene, anhydrous citric acid and artificial flavor. The hydrogenated oil is deodorized, and the citric acid is added during deodorization, the flavor and color components being added after deodorization. This is passed through an apparatus generally as discussed in Example 1. Here, the length of the resting tube is about 17 feet (about 5.2 m). This permits a resting time of about 4 minutes at a flow rate of 4500 pounds per hour. The temperature of the chilling and crystallizing device is somewhat higher than that of Example 1 due in large measure to the longer length of the resting tube unit. This temperature is about 87° F. to 88° F. (about 30.6° C. to about 31.1° C.). Resulting pellets have a diameter of 0.5 inch (about 13 cm) and a capillary melting point of 111.5° F. (about 44° C.). The solid fat index at 50° F. (10° C.) is 63 units. At 70° F. (21.1° C.), it is 52.5 units. At 80° F. (26.7° C.) it is 47.5 units. At 92° F. (33.3° C.) it is 30.5 units, and at 104° F. (40° C.) it is 9 units.

EXAMPLE 3

Shortening pellets designed particularly for biscuit dough formulations were prepared generally in accordance with the present invention. At 10° C., the solids content (SFC) as measured by NMR was 83.3%. At 21.1° C., it was 64.8%. At 26.7° C., it was 57.8%. At 33.3° C., it was 46.1% units. At 37.7° C., it was 32.5%. At 43.3° C., the NMR-measured SFC solids content was 11.7%.

The unblended formulation for making the solid pellets in accordance with the above was modified so as to incorporate 80% of that formulation blended with 20% of an existing shortening product of lower hardness values (VREAM VFD of Bunge Foods Corporation). This 80/20 blend provided a slightly softer, but generally acceptable product for biscuit uses. It analyzed as follows. It had a NMR-measured SFC solids content of 79% at 10° C., of 60% at 21.1° C., of 51.9% at 26.7° C., of 41.9% at 33.3° C., of 30.8% at 37.7° C., and of 11% at 43.3° C.

A similar blend, but this one incorporating 50% of the unblended solidified vegetable oil and 50% VREAM VFD, was prepared. Its NMR-measured SFC solids content values were 69.1% at 10° C., 48.5% at 21.1° C., 40.7% at 26.7° C., 26.9% at 33.3° C., 16.8% at 37.7° C., and 2.9% at 43.3° C.

A clumping test was conducted. None of these three products exhibited significant clumping when held at 90° F. for in excess of two months. It was generally observed that the products having a harder consistency, exhibited similar properties for even longer time periods.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A baking formulation comprising: between about 75 and about 95 weight percent of a dough formulation including a flour component, at least one of a sweetening component, an egg component, a milk component, and a water component; and between about 5 and about 25 weight percent of a shortening component which is a pelletized shortening made by a process comprising the steps of:

providing a molten shortening composition at a temperature above the melting point of the composition, allowing cooling of said molten composition to a cooled composition at a crystallization temperature at which said shortening composition begins to solidify, flowing said cooled shortening composition through an elongated tube for about 2 minutes to about 10 minutes and above while solidifying said cooled composition, thereby forming a flow of solid shortening composition within the elongated tube, passing said flow of solid shortening composition through a plurality of orifices at a downstream end portion of the elongated tube, said orifices each having a cross-sectional area less than that of the elongated tube, thereby extruding the solid shortening composition through the orifices as solid shortening pellets which are of reduced cross-sectional area and of reduced length when compared with the cross-sectional area and length of the elongated tube, and thereby providing solidified shortening pellets which, without requiring further treatment, resist clumping together at a temperature of at least about 70° F.; and said solidified shortening pellets have solids content values as measured by NMR of between about 27% and about 60% at 80° F. (26.7° C.), of between about 20% and about 50% at 92° F. (33.3° C.), of between about 13% and about 35% at 100° F. (37.8° C.), of between about 7% and about 20% at 104° F. (40° C.), and of between about 3% and about 14% at 110° F. (43.3° C.).

2. The baking formulation in accordance with claim 1, wherein said solidified shortening pellets have a Mettler Dropping Point of between about 110° and about 120° F. (between about 43.3° C. and about 48.9° C.).

3. The baking formulation in accordance with claim 1, wherein said temperature of the cooling step is between about 55° F. and about 95° F. (between about 12.8° C. and about 35° C.).

4. The baking formulation in accordance with claim 1, wherein the cross-sectional area of the elongated tube and the reduced cross-sectional area of the orifices are at a ratio, based on an internal diameter measurement, of between about 50 to 1 and about 5 to 1.

5. The baking formulation in accordance with claim 1, wherein said solidified shortening pellets have solids content values as measured by NMR of (a) between about 53% and about 85% at 50° F. (10° C.), (b) of between about 35% and about 65% at 70° F. (21.1° C.), or of both (a) and (b).

6. A baking formulation including: between about 75 and about 95 weight percent of a dough formulation including a flour component, a shortening component and at least one of a sweetening component, an egg component, a milk component, and a water component; and said shortening comprises:

a pelletized shortening of solidified shortening pellets which, without requiring further treatment, resist clumping together at a temperature of at least about 70° F.; and said solidified shortening pellets have solids content values as measured by NMR of between about 27% and about 60% at 80° F. (26.7° C.), of between about 20% and about 50% at 92° F. (33.3° C.), of between about 13% and about 35% at 100° F. (37.8° C.), of between about 7% and about 20% at 104° F. (40° C.), and of between about 3% and about 14% at 110° F. (43.3° C.).

7. The baking formulation in accordance with claim 6, wherein said solidified shortening pellets have a Mettler Dropping Point of between about 110° and about 120° F. (between about 43.3° C. and about 48.9° C.).

8. The baking formulation in accordance with claim 6, wherein said solidified shortening pellets have solids percentage values of (a) between about 53% and about 85% at 50° F. (10° C.), (b) of between about 35% and about 65% at 70° F. (21.1° C.), or of both (a) and (b).

9. A pelletized shortening made by a process comprising the steps of:

providing a molten shortening composition at a temperature above the melting point of the composition, allowing cooling of said molten composition to a cooled composition at a crystallization temperature at which said shortening composition begins to solidify, flowing said cooled shortening composition through an elongated tube for about 2 minutes to about 10 minutes and above while solidifying said cooled composition, thereby forming a flow of solid composition within the elongated tube, passing said flow of solid shortening composition through a plurality of orifices at a downstream end portion of the elongated tube, said orifices each having a cross-sectional area less than that of the elongated tube, thereby extruding the solid shortening composition through the orifices as solid shortening pellets which are of reduced cross-sectional area and of reduced length when compared with the cross-sectional area and length of the elongated tube, and thereby providing solidified shortening pellets which, without requiring further treatment, resist clumping together at a temperature of at least about 70° F.; and said solidified shortening pellets have solids content values as measured by NMR of between about 53% and about 85% at 50° F. (10° C.), of between about 35% and about 65% at 70° F. (21.1° C.), of between about 27% and about 60% at 80° F. (26.7° C.), of between about 20% and about 50% at 92° F. (33.3° C.), of between about 13% and about 35% at 100° F. (37.8° C.), of between about 7% and about 20% at 104° F. (40° C.), and of between about 3% and about 14% at 110° F. (43.3° C.).

10. The pelletized shortening in accordance with claim 9, wherein said solidified shortening pellets have a Mettler Dropping Point of between about 110° and about 120° F. (between about 43.3° C. and about 48.9° C.).

11. The pelletized shortening in accordance with claim 9, wherein said temperature of the cooling step is between about 55° F. and about 95° F. (between about 12.8° C. and about 35° C.).

12. The pelletized shortening in accordance with claim 9, wherein the cross-sectional area of the elongated tube and the reduced cross-sectional area of the orifices are at a ratio, based on an internal diameter measurement, of between about 50 to 1 and about 5 to 1.

13. A pelletized shortening comprising:

a shortening composition which had been melted, cooled, solidified and extruded into pellets, said pellets having a Mettler Dropping Point of between about 110° F. and about 120° F. (between about 43.3° C. and about 48.9° C.); said shortening pellets have a solids content as measured by NMR of between about 27% and about 60% at 80° F. (26.7° C.), of between about 20% and about 50% at 92° F. (33.3° C.), of between about 13% and about 35% at 100° F. (37.8° C.), of between about 7% and about 20% at 104° F. (40° C.), and of between about 3% and about 14% at 110° F. (43.3° C.); and said shortening pellets, without requiring treatment, resist clumping together at a temperature of at least about 70° F. (21.1° C.).

* * * * *

UNITED STATES PATENT AND TRADEMARK OFFICE

CERTIFICATE OF CORRECTION

PATENT NO : 6,054,167

DATED : April 25, 2000

INVENTOR(S) : Frank R. Kincs, Reynaldo G. Cruz and Thomas G. Crosby

It is certified that error appears in the above-identified patent and that said Letters Patent are hereby corrected as shown below:

Col. 2, line 8, "will made" should read --will be made--; line 41, after "the particular" insert --on--; line 49, delete "the" after "that".
Col. 3, lines 65-66, "it desired" should read --it is desired--.
Col. 8, line 10, "110° and" should read --110° F. and--; line 54, "110° and" should read --110° F. and--.

Signed and Sealed this

Tenth Day of April, 2001

Attest:

Nicholas P. Godici

NICHOLAS P. GODICI

*Attesting Officer* *Acting Director of the United States Patent and Trademark Office*